Patented Oct. 22, 1929                                1,732,774

UNITED STATES PATENT OFFICE

LORIN B. SEBRELL, OF AKRON, OHIO, ASSIGNOR TO THE GOODYEAR TIRE & RUBBER COMPANY, OF AKRON, OHIO, A CORPORATION OF OHIO

MANUFACTURE OF RUBBER COMPOSITIONS

No Drawing.        Application filed March 19, 1927.   Serial No. 176,837.

My invention relates to the manufacture of rubber compositions and it is directed specifically to a method of treating rubber compositions to render them less susceptible to the deteriorating effect of atmospheric agents.

The object of my invention is to improve the age-resisting properties of a rubber composition by associating with the composition a class of substantially non-accelerating reagents which are particularly suited to render a rubber product less susceptible to action of oxidizing elements.

For the purpose of promoting vulcanization, a variety of aldehyde amine reaction products have been employed satisfactorily. It has been noted that a product which has been vulcanized in the presence of such accelerator is characterized by exceptional age-resisting properties. More recently it has been observed that certain aldehyde amines react to form products which are inferior accelerators, but which, when incorporated in a vulcanized product, have a marked capacity for producing desirable age-resisting properties.

I have discovered that when croton aldehyde is caused to react with amines, particularly in an acidic medium, a product is formed which is an exceptionally good age-resisting reagent or, as it is commonly termed, "antioxidant". To prepare a product according to the principles of my invention, equal molecular proportions of aniline and hydrochloric acid are mixed together and cooled, after which a small quantity of water is added thereto. Croton aldehyde is then added and the mixture is refluxed for from four to six hours. The resultant mass is neutralized and steam distilled to remove any unchanged raw materials or volatile by-products.

When a material so prepared is associated with a vulcanized rubber product it manifests its antioxidant properties as will be evident from the test data tabulated below. Rubber compositions consisting of 100.00 parts rubber, 25.00 parts zinc oxide, 35.00 parts gas black, 2.75 parts sulfur, 1.75 parts diphenyl-guanidine, 2.00 parts antioxidant, that have been cured at 40# steam pressure withstand the effects of air maintained at 70° C., for a period of six days in proportion to the lowering of their tensile strength.

| Antioxidant | Tensile strength kgs/cm² | | Elongation | |
|---|---|---|---|---|
| | Original | Aged | Original | Aged |
| None | 280 | 200 | 590 | 525j |
| Croton aldehyde alpha naphthylamine | 280 | 265 | 580 | 550 |

The reaction product of crotonaldehyde with aniline hydrochloride was compounded in a mix containing the following ingredients: 50.00 parts rubber, 46.35 parts ZnO, 1.75 parts sulfur, .40 parts accelerator, 1.50 parts croton aldehyde aniline hydrochloride.

The above material was vulcanized for 45 minutes at 40 pounds steam pressure, and the vulcanized material was then subjected to artificial aging at a temperature of 236° F. and an air pressure of 75 pounds per square inch. Tabulated below are comparative test values of the stock containing crotonaldehyde aniline hydrochloride and a similar stock containing none.

| Antioxidant | Original | | Aged | |
|---|---|---|---|---|
| | Tensile kgs/cm² | Elong. | Tensile kgs/cm² | Elong. |
| None | 185 | 610 | 15 | 225 |
| Croton aldehyde aniline hydrochloride | 195 | 635 | 88 | 510 |

From the foregoing tables it will be apparent that by the incorporation of a small quantity of antioxidant material, the age resisting qualities of a stock are increased to a marked degree, thereby enhancing the value of the product. Obviously, other amines may be employed to react with the crotonaldehyde which may or may not be of an aromatic species; these would include the toluidines, xylidines, naphthylamines, and others, any of which may be prepared in a manner analogous to that described above.

Although only two compounds have been specifically set forth and but a single method of preparing the compounds has been described, it will be apparent to those skilled in the art that the invention is neither limited to the formula comprising the rubber composition, the manner in which the antioxidant is to be utilized in connection with the vulcanization of rubber, nor the method by which the antioxidant is produced, and I desire, therefore, that my invention be interpreted as restricted only by the prior art and the appended claims.

What I claim is:

1. A method of preserving the quality of a vulcanized rubber composition that comprises incorporating therein a material formed by the interaction of a croton aldehyde and an amine in the presence of an acidic body.

2. A method of preserving the quality of a vulcanized rubber composition that comprises incorporating therein a material which is substantially a non-accelerator formed by the interaction of a croton aldehyde and an amine in the presence of an acid.

3. A method of preserving the quality of a vulcanized rubber composition that comprises incorporating therein a material formed by the interaction of croton aldehyde and aniline in the presence of an acid.

4. A vulcanized rubber composition embodying a preservative formed by the interaction of a croton aldehyde and an amine in the presence of an acid.

5. A vulcanized rubber composition embodying a preservative formed by the interaction of a croton aldehyde and aniline in the presence of an acid.

In witness whereof, I have hereunto signed my name.

Signed at Akron, in the county of Summit and State of Ohio, this 18th day of March, 1927.

LORIN B. SEBRELL.